United States Patent

Bailey et al.

[11] Patent Number: 6,095,556
[45] Date of Patent: Aug. 1, 2000

[54] INFLATOR DISK ACTUATOR BACKER PLATE

[75] Inventors: Kirk M. Bailey, Brigham City; William Gregory Lowe, Ogden, both of Utah

[73] Assignee: Autoliv ASP, Inc., Ogden, Utah

[21] Appl. No.: 09/120,026

[22] Filed: Jul. 20, 1998

[51] Int. Cl.$^7$ .................................................. B60R 21/26
[52] U.S. Cl. ........................ 280/737; 280/741; 102/531; 102/204
[58] Field of Search ...................... 280/737, 736, 280/741, 742; 102/530, 531, 204

[56] References Cited

U.S. PATENT DOCUMENTS

| | | |
|---|---|---|
| 3,788,667 | 1/1974 | Vancil . |
| 3,868,124 | 2/1975 | Johnson . |
| 3,877,721 | 4/1975 | Brown, Jr. . |
| 3,948,540 | 4/1976 | Meacham . |
| 5,078,422 | 1/1992 | Hamilton . |
| 5,131,680 | 7/1992 | Coultas . |
| 5,226,561 | 7/1993 | Hamilton . |
| 5,226,667 | 7/1993 | Coultas . |
| 5,230,531 | 7/1993 | Hamilton . |
| 5,242,194 | 9/1993 | Popek . |
| 5,516,147 | 5/1996 | Clark . |
| 5,553,889 | 9/1996 | Hamilton . |
| 5,602,361 | 2/1997 | Hamilton . |
| 5,616,883 | 4/1997 | Hamilton . |
| 5,627,337 | 5/1997 | Hamilton et al. ................... 280/742 |
| 5,630,618 | 5/1997 | Hamilton . |
| 5,664,802 | 9/1997 | Harris et al. ...................... 280/736 |
| 5,788,275 | 8/1998 | Butt . |
| 5,882,036 | 3/1999 | Moore et al. ..................... 280/736 |

Primary Examiner—Peter C. English
Assistant Examiner—Ruth Ilan
Attorney, Agent, or Firm—Sally J. Brown

[57] ABSTRACT

An inflator for a vehicle inflatable safety system comprising a housing configured to contain a gas generating material, an igniting assembly, and an activating assembly. The igniting assembly includes an actuator plate that is configured to ignite the gas generating material contained in the housing and backer plate. The backer plate is attached to the housing such that a seal is formed therebetween that is capable of substantially stopping the flow of the gas generated by the gas generating material in any direction other than the predetermined directions. The igniting assembly also comprises a booster cup, an ignition charge, and a percussion primer. The booster cup with a conical-shaped end surface with the percussion primer disposed therein proximate to the actuator plate for igniting the gas generating material. The actuator plate and the end surface of the booster cup are in contact only along the peripheral edges thereof. The backer plate and the actuator plate are configured to cooperate such that the backer plate prevents the actuator plate from bulging toward said projectile prior to the actuator plate being engaged. The backer plate is positioned substantially against the actuator plate such that said backer plate is between said actuator plate and said projectile. The backer plate is sized and configured so as to hold the actuator plate substantially flat until the actuator plate is impacted by the projectile to ignite the gas generating material. The activating assembly is connected to the housing and comprises a projectile that is configured to impact the actuator piston of said actuator plate so as to cause the actuator plate to move into impacting engagement with the percussion primers to ignite the ignition charge and thereby the gas generating material.

12 Claims, 4 Drawing Sheets

6,095,556

INFLATOR DISK ACTUATOR BACKER PLATE

BACKGROUND OF THE INVENTION

1. The Field of the Invention

The present invention relates to a safety device used particularly in motor vehicles, which upon the onset of a collision, deploys an inflatable restraint cushion, known as an air bag cushion, to protect the occupants of the vehicle from the impact of the collision. More particularly this invention relates to an air bag inflator which uses percussion primers as part of the ignition assembly.

2. The Relevant Technology

An air bag safety system is typically activated after receiving a signal from a detector or sensor that indicates that inflation of the air bag cushion is required. Various types of inflators are used in air bag safety systems to rapidly deploy the air bag cushion. One type of inflator, shown generally in FIG. 1 as reference number 10, utilizes an activating assembly 12 which initiates inflation of the air bag assembly by triggering an electroexplosive device 14 to "remove" a barrier 16 disposed between activating assembly 12 and an inflating medium contained within the inflator housing 18. Upon barrier 16 being removed, the inflating medium contained in inflator housing 18 is supplied to the air bag cushion (not shown) of the air bag safety assembly. The inflating medium can be pressurized gases, gases generated by combustion of a gas generating material or propellent, a mixture thereof, or other suitable fluids.

Barrier 16 is typically removed by breaking or penetrating barrier 16 using an object that is directed at barrier 16 upon triggering electroexplosive device 14 within activating assembly 12. Many types of objects have been used to "remove" barrier 14. One method of removing barrier 16 utilizes activating assembly 12 that includes a projectile 20. Once electroexplosive device 14 in activating assembly 12 is triggered, projectile 20 is propelled towards barrier 16. In some inflators once projectile 20 pierces barrier 16, pressurized gas contained within inflator housing 18 fills the air bag cushion (not shown). In other inflators, such as inflator 10, when projectile 20 pierces barrier 16 the pressurized gas contained within inflator housing 18 begins to fill the air bag cushion. Simultaneously, projectile 20 continues its flight until it strikes igniting assembly 22 which ignites gas generating material 24. Gas generating material 24 rapidly generates gas to complete inflating the air bag cushion.

In this type of inflator 10, generally speaking, projectile 20 is released upon triggering activating assembly 12 to ignite a percussion primer 26 in igniting assembly 22. More specifically, projectile 20 strikes an actuating member, such as an actuator plate 22, that is part of igniting assembly 22. The impact of projectile 20 causes actuator plate 22 to be displaced to strike percussion primer 26 and ignite gas generating material 24. Current designs and technology of available inflators have several problems that adversely effect the performance of the inflator.

A first problem is that this type of an inflator has numerous components that make the inflator expensive to manufacture and assemble. A less costly inflator would include fewer and/or simpler parts. Merely using inexpensive parts, such as a less expensive actuator plate, however, does not solve the problem and actually exasperates the more significant problems with current designs of an inflator, such as inflator 10, illustrated in FIG. 1.

One problem that is experienced with current designs of inflators, such as inflator 10, is that pressurized gas contained in inflator housing 18 gets into igniting assembly 28 and becomes trapped, particularly in the space under actuator plate 30. The trapped pressurized gas causes actuator plate 30 to move toward projectile 20 and barrier 116. This is particularly problematic when a thinner, more flexible, or less expensive actuator plate 30 is used in igniting assembly 28. This phenomena is often referred to as "bulging".

When actuator plate 30 is impacted by projectile 20, actuator plate 30 moves longitudinally away from barrier 16 and impacts percussion primer 26. The movement of actuator plate 30 to impact primer 26 is referred to as the "actuating stroke." When actuator plate 30 is bulging, the actuating stroke performed by actuator plate 30 has an insufficient depth. Any bulging of actuator plate 30 causes the actuating stoke of actuator plate 30 to either miss primer 26 or to fail to strike primer 26 sufficiently hard to ignite gas generating material 24. Consequently, both performance and reliability of the entire air bag safety system has been damaged and sacrificed.

Further, in the current designs of ignitor 10, actuator plate 30 fails to prevent the gases being rapidly formed by gas generating material 24 from passing around the edges of actuator plate 30 instead of exiting in the predetermined direction. Bulging may also occur in those instances when percussion primer 26 has a hole in it or is even missing allowing even more compressed gas to be trapped under actuator plate 30. Any bulging of actuator plate 30 pulls the edge of actuator plate 30 away from the interior surface of gas generator housing 28. Consequently, current designs of inflators 10 and particularly, actuator plate 30 do not maintain a seal with gas generator housing 28. When actuator plate 30 bulges under the force of either the pressurized gas or the gas being rapidly generated, there is a gap between the interior surface of gas generator housing 28 and the edge of actuator plate 30 through which the gas flows around actuator plate 30 toward activating assembly 12. This "back flow" of gases around actuator plate 30 is detrimental to the air bag safety system as well as hurting the overall performance of inflator 10 because if allowed, the hot gases being rapidly generated by gas generating material 24 will flow directly into the air bag cushion (not shown) and can scorch or burn the air bag cushion. There is the real potential that the back flow of hot gases around the edge of actuating plate 22 will actually burn a hole through the air bag cushion.

Accordingly, there is a need to improve the igniting assembly of inflators that use percussion primers in the igniting assembly to overcome the foregoing disadvantages. In addition, there in a need to improve the inflators such that the inflator itself is comprised of fewer, simpler parts, thereby making the inflator less costly to manufacture and assemble without sacrificing accuracy or reliability.

SUMMARY AND OBJECTS OF THE INVENTION

An object of the present invention is to provide an inflator for an air bag safety system with an ignition assembly configured to minimize any bulging of an actuator plate contained therein, thereby improving the reliability and effectiveness of the inflator.

Another object of the present invention is to provide an inflator that includes an ignition assembly configured to prevent bulging of the actuator plate and is capable of maintaining a seal such that the ignition assembly acts as a check valve to prevent back gas flow around the actuator plate.

Another object of the present invention is to provide an ignition assembly in an inflator for an air bag safety system that is configured to minimize the volume of compressed gas that is trapped behind the actuator plate.

A further object of the present invention is to provide an ignition assembly capable of providing an accurate and precise actuator stroke to impact a primer disposed therein.

Yet another object of the present invention is to reduce the cost and the number of components in an inflator for an air bag safety system without sacrificing reliability or performance of the ignitor or of the air bag safety system.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an inflator for a vehicle inflatable safety system is provided that comprises a housing, an activating assembly, and an igniting assembly The housing is configured to contain a gas generating material.

The igniting assembly includes an actuator plate that is configured to ignite the gas generating material contained in the housing. The actuator plate comprises an actuator piston extending toward the activating assembly and a deflecting portion extending radially from the actuator piston. The deflecting portion of the actuator plate extends laterally across the interior of the housing. The activating assembly is also connected to the housing and comprises a projectile that is configured to impact the actuator piston of the actuator plate so as to cause the actuator plate to move into impacting engagement with the percussion primers to ignite the ignition charge and thereby the gas generating material.

The igniting assembly also comprises a backer plate that is attached to the housing such that a seal is formed therebetween that is capable of substantially stopping the flow of the gas generated by the gas generating material in any direction other than the predetermined directions. The igniting assembly further includes a booster cup, an ignition charge, and a percussion primer. The booster cup has an end surface with the percussion primer disposed therein. The end surface of the booster cup is proximate to the actuator plate for igniting the gas generating material. The end surface of the booster cup has a substantially conical-shaped portion. As a result, the actuator plate and the end surface of the booster cup are in contact only along the peripheral edges thereof.

The backer plate and the actuator plate are configured to cooperate such that the backer plate prevents the actuator plate from bulging toward the projectile prior to the actuator plate being engaged. The backer plate is positioned substantially against the actuator plate such that the backer plate is between the actuator plate and the projectile. The backer plate has an opening formed therein that is configured to cooperate with the actuator piston of the actuator plate. The actuator piston is movably disposed in the opening in the backer plate and extends toward the projectile. The backer plate is sized and configured so as to hold the deflecting portion of the actuator plate substantially flat until the actuator plate is impacted by the projectile to strike the percussion primers thereby igniting the gas generating material. The housing has an indented portion formed therein proximate to the backer plate that acts as a mechanical stop to keep the backer plate in position against the actuator plate.

The backer plate acts as a check valve to keep significant quantities of combustion gases from passing around the actuator plate. The backer plate is positioned next to the actuator plate proximate to the projectile and prevents bulging and consequent insufficient depth and/or inaccurate actuating strokes of the actuator plate.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is related to an inflator used as part of an air bag safety system. The inflator includes an ignition assembly configured to minimize any bulging of an actuator plate contained therein, thereby improving the reliability of the inflator. The ignition assembly is also capable of maintaining a seal such that the igniting assembly acts as a check valve to prevent the back flow of gas around the actuator plate. In addition, the number of components of the inflator has been reduced, resulting in the cost of the inflator decreasing without sacrificing reliability or performance of the ignitor.

Figure 1:
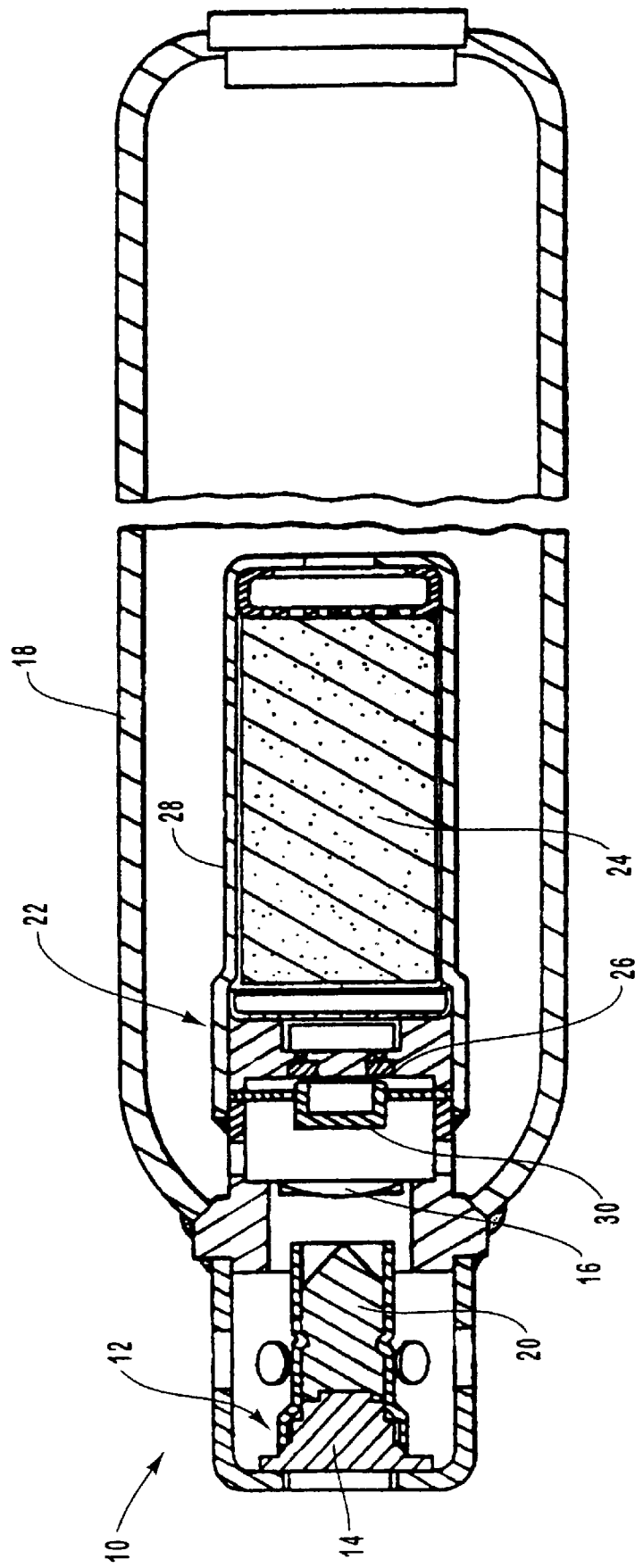
FIG. 1 is a partial cross-sectional elevation view of one embodiment of an existing inflator.
Figure 2:
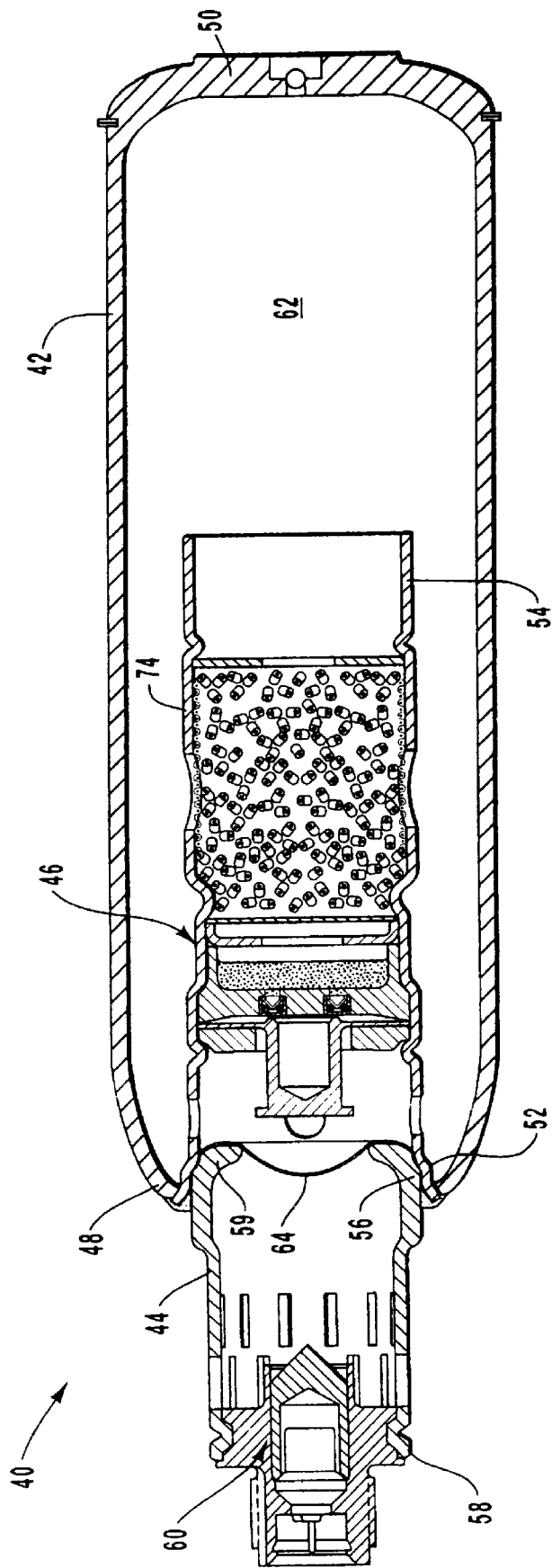
FIG. 2 is a cross-sectional elevation view of one embodiment of an inflator used in an air bag safety system incorporating the teachings of the present invention.

FIG. 2 illustrates one embodiment of an air bag inflator 40 for inflating an air bag cushion of an air bag safety system. Inflator 40 is well adapted for inflating the air bag cushion on the passenger side of a vehicle. Inflator 40 may, however, be used to inflate air bag cushions in an air bag safety system in other locations as well.

According to one aspect of the present invention, inflator 40 comprises a housing means for containing a gas generating material therein. Structure performing the function of such a housing means comprises a housing 42, a diffuser 44, and a gas generator 46. One embodiment of housing 42 is shaped as a generally cylindrical and elongated canister that has an open end 48 and a closed end 50. Gas generator 46 is disposed within housing 42 as depicted in FIG. 2 and is configured to rapidly generate gas that will be used to inflate the air bag cushion (not shown). Gas generator 46 has a first end 52 and a second end 54. First end 52 of gas generator 46 is attached to open end 48 of housing 42.

Also attached to open end 48 of housing 42 is diffuser 44 which extends longitudinally away from open end 48 of housing 42. Gas contained in housing 42 and/or created in gas generator 44 exits inflator 40 through diffuser 44. Diffuser 44 has an attachment end 56 and a remote end 58. Attachment end 56 of diffuser 44 is attached to open end 48 of housing 42. Attachment end 56 of diffuser 44 has a lip 59 formed thereon that extends radially inward. In one embodiment, diffuser 44 is substantially cylindrical and tubular and as depicted in FIG. 2 is a one-piece member. Various other embodiments and shapes of diffuser 44 are equally effective in carrying out the function thereof. As illustrated, diffuser 44 and gas generator 46 are substantially aligned.

Figure 3:
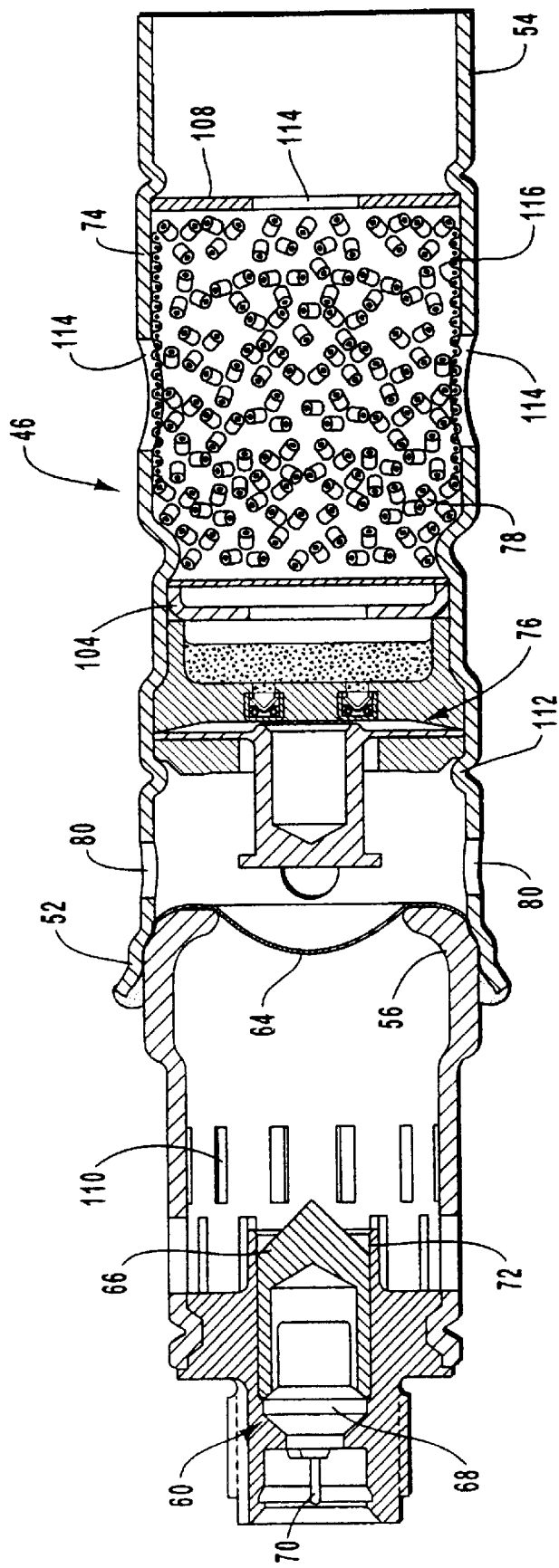
FIG. 3 is an enlarged partial cross-sectional elevation view of one embodiment of an activation assembly and an ignition assembly of FIG. 2.

According to another aspect of the present invention, inflator 40 comprises igniting means for igniting gas generating material 78 shown in FIG. 3. The igniting means is in sealing engagement with the housing means such that the igniting means substantially stops the flow of the gas generated by gas generating material 78 in any direction other than the predetermined directions. Structure performing the function of such an igniting means for igniting gas generating material 78 comprises igniting assembly 76.

According to another aspect of the present invention, inflator 40 comprises activating means for engaging the igniting means. Structure performing the function of such an activating means for engaging the igniting means comprises an activating assembly 60 configured to engage the igniting means, thereby igniting gas generating material 78. As illustrated in FIG. 2, activating assembly 60 is disposed in remote end 58 of diffuser 44. Together activating assembly 60 and diffuser 44 substantially close open end 48 of housing 42. Diffuser 44 with activating assembly 60 disposed therein along with housing 42 define a substantially enclosed space. Diffuser 44 and gas generator 46 are attached to open end 48 of housing 42 using conventional attaching and fastening methods including welds, screws, or bolts. In the embodiment illustrated, diffuser 44 and gas generator 46 are welded to open end 48 of housing 42.

Housing 42 contains a source of compressed or pressurized inert gas indicated generally in FIG. 2 by reference number 62. By way of example and not limitation, inert gas 62 contained in housing 42 may be selected from nitrogen, argon, helium, neon, krypton, xenon, and radon. It is preferred that inert gas 62 be argon. Inert gas 62 may have a pressure range of about 2000 to about 5000, psi depending on the ambient temperature. It is preferred that inert gas 62 have a pressure of about 2800 psi to about 3500 psi within housing 42.

Disposed between attachment end 56 of diffuser 44 and first end 52 of gas generator 46 is a barrier or isolating disk 64 as depicted in FIGS. 2 and 3. Isolating disk 64 is configured to cooperate with lip 59 on attachment end 56 of diffuser 44. Isolating disk 64 extends across the opening defined by lip 59 and is held in place between attachment end 56 of diffuser 44 and first end 52 of gas generator 46. Lips 59 provides support to isolating disk 64. Isolating disk 64 contains pressurized gas 62 within housing 44 until a condition requiring inflation of the air bag cushion (not shown) is sensed by a detector (not shown). As illustrated, one embodiment of isolating disk 64 is dome-shaped. Various other embodiments of isolating disk 64 are equally effective in carrying out the intended function thereof Referring to FIG. 2, in broad terms, activating assembly 60 effects the release of gas 62 from housing 42 by breaking isolating disk 64 in a controlled manner to initiate a flow of stored gas 62 to an air bag cushion or other expandable confinement (not shown). Specifically, activating assembly 60 comprises an electroexplosive device and a projectile 66 illustrated in FIG. 3. One embodiment of an electroexplosive device is, by way of example and not limitation, a squib 68. Various other types of electroexplosive devices are equally effective in performing the function thereof. Squib 68 is electrically activated and includes electrical terminals 70 for connection to an electrical triggering system of the vehicle.

Mounted over the end of squib 68 opposite from electrical terminals 70 is projectile 66. In the figures, projectile 66 is depicted as being cylindrical and having a pointed tip. Various other embodiments of projectile 66, however, are equally effective in performing the function thereof. Projectile 66 may be configured to cooperate with a desired tear pattern in isolating disk 64. Activating assembly 60 may also include an optional barrel 72. Barrel 72 assists in guiding projectile 66 toward isolating disk 64.

As previously mentioned, inflator 40 includes gas generator 46 positioned within housing 42, as shown in FIG. 2. Gas generator 46 is provided to augment the flow of gas to the air bag cushion (not shown) after the latter has been initially expanded by the flow of pressurized gas 62 from housing 42. As illustrated in FIG. 3, one embodiment of gas generator 46 comprises a gas generator sleeve 74, an igniting assembly 76, and a quantity of gas generating material 78. First end 52 of gas generator sleeve 74 is attached to attachment end 56 of diffuser 44 with isolating disk 64 disposed therebetween.

Figure 4:
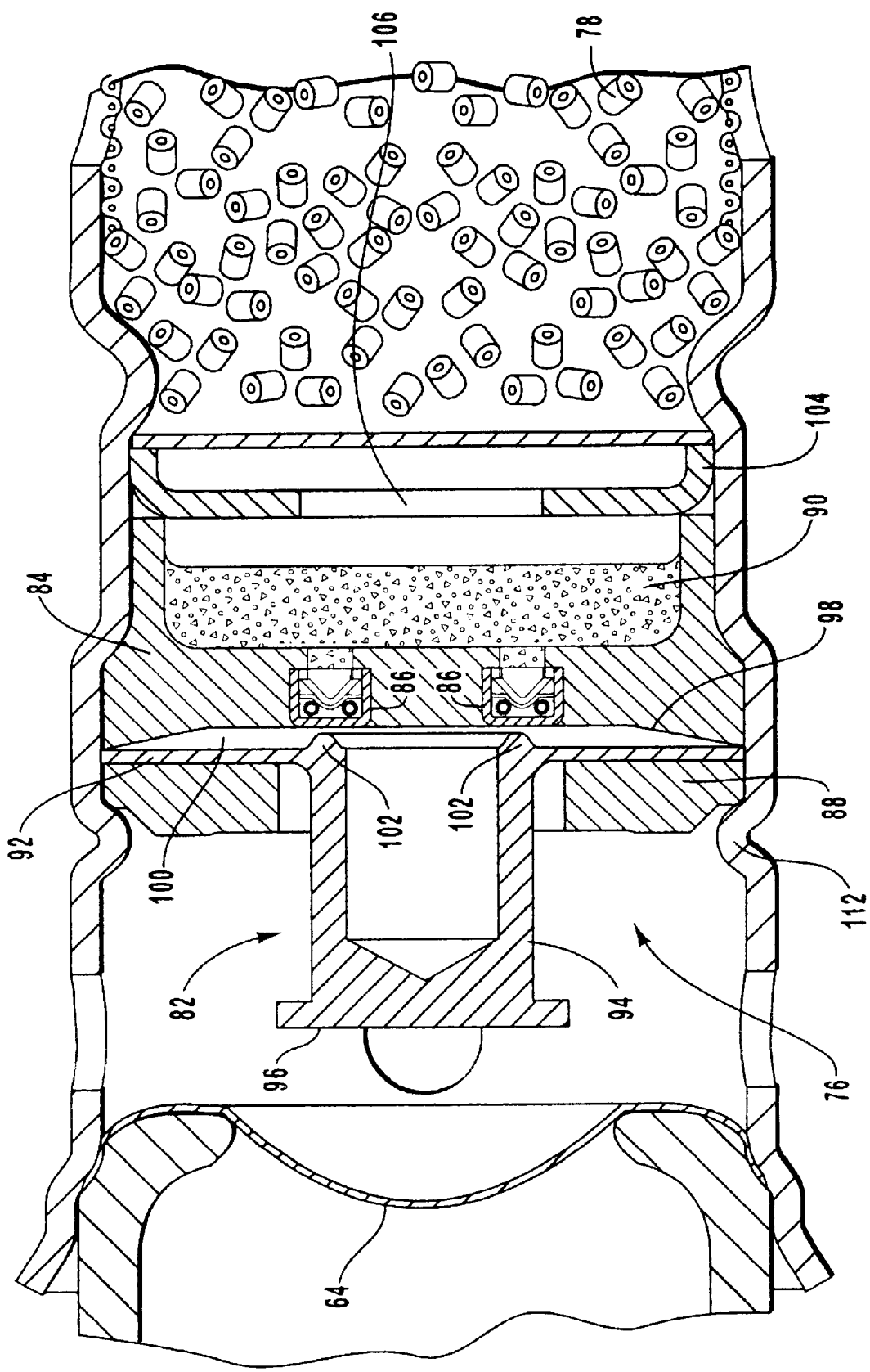
FIG. 4 is an enlarged partial cross-sectional view of the ignition assembly of FIG. 2.

Igniting assembly 76 is at least partially positioned within gas generator 46 to ignite gas generating material 78. Gas generator sleeve 74 has interior ports 80 formed therein towards first end 52 of gas generator 46. One embodiment of igniting assembly 76 is attached within gas generator sleeve 74 such that interior ports 80 are positioned between isolating disk 64 and igniting assembly 76. Referring to FIG. 4, igniting assembly 76 comprises an actuator plate 82, a booster cup 84, and percussion primers 86. Igniting assembly 76 also includes a backer plate 88 and an ignition charge 90.

Actuator plate 82 is disposed within gas generator sleeve 74 across the interior thereof to ignite gas generating material 78. Actuator plate 82 comprises a deflecting portion 92 and an actuator piston 94. One embodiment of actuator plate 82, as depicted in FIG. 4, is configured such that actuator piston 94 extends longitudinally toward projectile 66 and isolating disk 64. Deflecting portion 92 of actuator plate 82 extends radially from actuator piston 94. It is preferred that actuator piston 94 be substantially aligned with projectile 66.

Actuator piston 94 has an impact surface 96 upon which projectile 66 impacts. In the figures, impact surface 96 is shown as being substantially flat. Impact surface 96 could, however, be concave. In addition, actuator piston 94 is shown as being fairly tall as it extends toward projectile 66. Actuator piston 94 could be shorter in relation to deflecting portion 92. It is, however, preferred that the distance between impact surface 96 of actuator plate 82 and projectile 66 be minimized. In addition, one embodiment of actuator piston 94 as shown in the figures is substantially hollow. Actuator piston 94 may have various other shapes and configurations and perform the function thereof equally effectively. For example, actuator piston 94 may only be half hollow.

As illustrated, deflecting portion 92 is very thin in relation to the length of actuator piston 94. In one embodiment, deflecting portion 92 is substantially planar. Deflecting portion 92 could have other configurations. By way of example and not limitation, both surfaces of deflecting portion 92 could be concave or while the surfaces of deflecting portion 92 remains flat, deflecting portion could be non-perpendicular to actuator piston 94. What is required is that deflecting portion 92 allows actuator plate 82 to have an actuating stroke in response to impact surface 96 of actuator piston 94 being impacted by projectile 66. In addition, deflecting portion 92 must cooperate with booster cup 84 on one side and backer plate 88 on the opposite side.

Positioned in gas generator sleeve 74 proximate to actuator plate 82 toward second end 54 of gas generator 46 is booster cup 84. Booster cup 84 holds percussion primers 86 and an ignition charge 90. One embodiment of booster cup 84 has an end surface 98 proximate to actuator plate 82 that has a substantially conical-shaped portion. The conical-shape of end surface 98 and the adjacent surface of actuator plate 82 define a cavity 100 therebetween. One advantage of the conical-shaped portion of end surface 98 is that only the peripheral edge of end surface 98 of booster cup 84 contacts deflecting portion 92 of actuator plate 82 and helps to minimize the volume of cavity 100, thereby reducing the amount of pressurized gas 60 that can be trapped in cavity 100 between actuator plate 82 and booster cup 84. End surface 98 of booster cup 84 has at least one notched out region configured to receive percussion primers 86 therein. Booster cup 84 also has a cavity formed therein proximate to primers 86 away from end surface 98 that is configured to hold ignition charge 90.

Actuator plate 82 has an annular ridge 102 formed thereon that extends longitudinally in the opposite direction as actuator piston 94 and toward percussion primers 86. Annular ridge 102 is configured to impact percussion primers 86. Ridge 102 may be a continuous ridge or may be a plurality of individual ridges extending toward primers 86. Various embodiments of ridge 102 perform the function thereof with equal effectiveness.

One aspect of the present invention solves the "bulging" problem of an actuator plate as well as the back flow of generated gases through first end 52 of gas generator sleeve 74 by having igniting assembly 76 include backer plate 88 and an indented portion 112 formed in gas generator sleeve 74 as depicted in FIGS. 3 and 4. Backer plate 88 prevents the bulging of actuator plate 82 and back flow of gas being generated in the event of a hole in percussion primers 86 or even an out of place primer 86. As shown in the figures, backer plate 88 is disposed against the surface of deflecting portion 92 of actuator plate 82 facing projectile 66. Backer plate 88 has an opening configured to movably receive actuator piston 94. Backer plate 88 is sized and configured to cooperate with the interior surface of gas generator sleeve 74 such that backer plate 88 is in a sealed engagement therewith. In one embodiment, backer plate 88 is ring-shaped.

Gas generator sleeve 74 includes an indented portion 112 that extends radially inward. Indented portion 112 assists backer plate 88 to stay in sealed engagement with the interior surface of gas generator sleeve 74 not withstanding vibrations from the vehicle and other movement during the life of the air bag safety system as well as the impact from projectile 66. Indented portion 112 may be a plurality of indents around the periphery of gas generator sleeve 74 which extend radially into the interior thereof. In the alternative, by way of example and not limitation, indented portion 112 may form several noncontinuous annular portions that extend radially into the interior volume of gas generator sleeve 74 to cooperate with backer plate 88. One preferred embodiment of indented portion 112 forms a continuous annular ring that extends radially into the interior volume of gas generator sleeve 74 to cooperate with backer plate 88, thereby mechanically forcing backer plate 88 to staying position against actuator plate 82 and to remain in a sealed engagement with the interior surface of gas generator sleeve 74. Various embodiments of indented portion 112 perform the function thereof equally effectively.

Consequently, any force exerted on actuator plate 82 tending to "bulge" deflecting portion 92 of actuator plate 82 toward isolating disk 64 and projectile 66 is negated by the presence of backer plate 88. Further, the seal formed between the edge of backer plate 88 and the interior surface of gas generator sleeve 74 substantially reduces and even eliminates the amount of gas that gets around actuator plate 82. The seal between the edge of backer plate 88 and the interior surface of gas generator sleeve 74 acts as a check valve to prevent any back flow of gases generated by gas generating material 78 around the periphery of deflecting portion 92 of actuator plate 82. Backer plate 88 and actuator plate 82 stop the "back flow" of gases around actuator plate 82 and prevent the hot gases being rapidly generated by gas generating material 78 from flowing out first end 52 of gas generator 46 and diffuser 44 directly into the air bag cushion (not shown).

As shown in FIG. 4, gas generator 46 also includes a retainer 104 that is disposed in gas generator sleeve 74 against booster cup 84 toward second end 54 of gas generator 46. Retainer 104 has an opening 106 formed therein such that upon ignition charge 90 being ignited gas generating material 78 is also ignited. Gas generator sleeve 74 has openings 114 therein, as depicted in FIG. 3, through which the gases generated by gas generating material 78 exit gas generator 46. It is preferred that the generated gases exit gas generator 46 both radially and longitudinally out second end 54 of gas generator 46 through openings 114. Various other arrangements of openings 114 are equally effective in allowing the gas to exist gas generator 46 out second end 54 thereof.

In one embodiment illustrated in FIG. 3, gas generating material 78 is contained in second end 54 of gas generator sleeve 74 using screen material 116. Gas generator 46 may also include an optional strainer 108 to retain gas generating material 78 in second end 54 of gas generator sleeve 74 and to filter gases exiting gas generator 46.

When actuator piston 94 of actuator plate 82 is impacted by projectile 66, deflecting portion 92 of actuator plate 82 allows actuator piston 94 and ridge 102 to move toward booster cup 84 such that ridge 102 impacts percussion primers 86 to ignite ignition charge 90 and gas generating material 78 in an actuating stroke. It is desirable for deflecting portion 92 to allow actuator plate 82 to move only when actuator plate 82 is impacted by projectile 66. Thus, actuator plate 82, and particularly deflecting portion 92, should have sufficient stiffness so as to reduce the potential for inadvertent ignition of gas generating material 78.

Upon receipt of a signal from a detector (not shown) which senses a condition requiring operation of the inflator 40 in an air bag safety system, the detector (not shown) sends a signal to activating assembly 60 at the onset of a collision to fire projectile 66. Activating assembly 60 fires projectile 66 toward isolating disk 64. Projectile 66 initially penetrates and passes through isolating disk 64 thereby providing a passageway for pressurized gas 62 to exit housing 42. The piercing of isolating disk 64 allows pressurized inert gas 60 to begin flowing from housing 42 though interior ports 80 in gas generator sleeve 74. Pressurized gas 60 flows into diffuser 44. Diffuser 44 has gas discharge openings 110 formed therein through which pressurized gas 62 exits inflator 40 and passes directly into the air bag cushion (not shown) to initiate inflation of the air bag cushion. Various numbers and arrangements of gas discharge openings 110 are equally effective. Gas discharge openings 110 are depicted as being rectangular. Gas discharge openings could, however, have various other configurations and perform the function thereof with equal effectiveness. By way of example and not limitation, gas discharge openings 92 could be round, oval, square or various other shapes or combinations thereof.

Projectile 66 continues to advance until it strikes impact surface 96 of actuator piston 94 of actuator plate 82. Upon impact, deflecting portion 92 of actuator plate 82 deflects into a position which causes annular ridge 102 on actuator plate 82 to strike percussion primers 86, thereby igniting ignition charge 90, and as a result, gas generating material 78 in gas generator 46. Gas generating material 78 rapidly creates gas which exits gas generator sleeve 74 through openings 114. In the preferred embodiment, the generated gas flows both radially and axially out of second end 54 of gas generator sleeve 74.

Thus, in accordance with the invention, there has been provided in an inflator that includes actuator plate 82, booster cup 84 with a substantially conical-shaped end surface 98 that minimizes the volume of cavity 100 and incorporates a backer plate 86 to prevent actuator plate 82 from bulging and back gas flow. This improved and simplified ignition train reduces cost, weight and complexity of an inflator 40. It can be appreciated by those skilled in the art that backer plate 88 that together with actuator plate 82 that act as a check valve has utility in other related technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An inflator for a motor vehicle inflatable safety system comprising:
    (a) a housing configured to contain a gas generating material;
    (b) an igniting assembly being configured to ignite said gas generating material, said igniting assembly comprising an actuator plate, a backer plate, and a booster cup, said backer plate being positioned substantially against said actuator plate such that said backer plate is between said actuator plate and a projectile, said booster cup having an end surface proximate to said actuator plate, said end surface of said booster cup having a substantially conical-shaped portion, wherein said actuator plate and said end surface of said booster cup are in contact only along the peripheral edges thereof, said igniting assembly being attached to said housing such that a seal is formed therebetween capable of substantially stopping the flow of the gas generated by said gas generating material in any direction other than a plurality of predetermined directions; and
    (c) an activating assembly connected to said housing, said activating assembly comprising said projectile configured to impact said igniting assembly to ignite said gas generating material.

2. An inflator as recited in claim 1, wherein said ignition assembly further comprises an ignition charge and a percussion primer disposed in said booster cup for igniting said gas generating material.

3. An inflator as recited in claim 1, wherein said housing has an indented portion formed therein proximate to said backer plate, said indented portion acting as a mechanical stop to keep said backer plate in position against said actuator plate.

4. An inflator for a motor vehicle inflatable safety system comprising:
    (a) a housing configured to contain a gas generating material;
    (b) an igniting assembly comprising an actuator plate being configured to ignite said gas generating material, said actuator plate comprising:
        an actuator piston extending toward an activating assembly;
        a deflecting portion extending radially from said actuator piston, said deflecting portion extending laterally across said housing; and
        a ridge extending longitudinally in an opposite direction as said actuator piston;
    said igniting assembly further including a backer plate, said backer plate being attached to said housing such that a seal is formed therebetween capable of substantially stopping the flow of the gas generated by said gas generating material in an direction other than a plurality of predetermined directions, said backer plate being positioned substantially against said actuator plate so as to prevent said actuator plate from bulging away from said gas generating material, wherein said backer plate has an opening formed therein configured to receive said actuator piston of said actuator plate; and
    (c) said activating assembly connected to said housing, said activating assembly comprising a projectile configured to impact said actuator plate to ignite said gas generating material, said backer plate being proximate to said deflecting portion of said actuator plate so as to be positioned between said deflecting portion and said projectile.

5. An inflator as recited in claim 4, wherein said igniting assembly further comprises:
    (a) a booster cup having an end surface proximate to said actuator plate, said end surface of said booster cup having a substantially conical-shaped portion, said end surface of said booster cup having a recess formed therein, said recess being substantially aligned with said ridge on said actuator plate, said booster cup having a cavity formed therein proximate to said recess away from said end surface;
    (b) a percussion primer disposed in said recess in said end surface of said booster cup; and
    (c) an ignition charge contained in said cavity of said booster cup proximate to said percussion primer, said percussion primer being impactedly engaged by said ridge on said actuator plate upon said actuator piston being impacted by said projectile thereby igniting said ignition charge and said gas generating material.

6. An inflator as recited in claim 5, wherein said actuator plate and said end surface of said booster cup defining a cavity therebetween, said end surface of said booster cup and said actuator plate being configured to minimize the volume of said cavity.

7. An inflator as recited in claim 5, wherein said ridge on said of said actuator plate comprises a continuous ring that strikes said percussion primer disposed in said recess formed in said end surface of said booster cup.

8. An inflator as recited in claim 4, wherein said deflecting portion of said actuator plate is flat and is retained flat by said backer plate until actuation.

9. An inflator as recited in claim 4, wherein said housing has an indented portion formed therein proximate to said backer plate, said indented portion being positioned between said backer plate and said projectile and acting as a mechanical stop to keep said backer plate in position against said actuator plate.

10. An inflator as recited in claim 9, wherein said indented portion forms a continuous annular ring around said housing.

11. An ignition assembly for igniting an ignition charge comprising:

(a) at least one percussion primer;

(b) a booster cup having said at least one percussion primer positioned in a recess formed in the end surface thereof, wherein at least a portion of said end surface is conical-shaped, said booster cup having a peripheral edge, said booster cup having a cavity formed proximate to said percussion primer;

(c) an ignition charge disposed in said cavity in said booster cup proximate to said percussion primer;

(d) an actuator plate which has a peripheral edge in engagement with said peripheral edge of said booster cup;

(e) a backer plate for preventing said actuator plate from bulging until said actuator plate is activated, wherein, upon being activated, said actuator plate moves into impacting engagement with said percussion primer to ignite said ignition charge.

12. An ignition assembly as recited in claim 11, wherein said actuator plate is flat and is retained flat by said backer plate.

* * * * *